United States Patent [19]
Wentz

[11] 3,954,185
[45] *May 4, 1976

[54] HYDRAULIC MOTOR SYSTEM

[75] Inventor: Edward A. Wentz, Gaithersburg, Md.

[73] Assignee: American Chain & Cable Company, Inc., Bridgeport, Conn.

[ * ] Notice: The portion of the term of this patent subsequent to Oct. 21, 1992, has been disclaimed.

[22] Filed: Dec. 11, 1972

[21] Appl. No.: 314,160

Related U.S. Application Data

[60] Division of Ser. No. 198,917, Nov. 15, 1971, Pat. No. 3,792,758, which is a continuation of Ser. No. 840,667, July 10, 1969, abandoned.

[52] U.S. Cl............................ 214/1 BB; 214/16.4 A
[51] Int. Cl.²............................................. B65J 3/00
[58] Field of Search................ 214/1 BB, 730, 731, 214/1 B, 16.14 A–16.14 E, 16.42 R, 16.42 A; 212/55; 187/17; 92/117, 146, 151; 91/196

[56] References Cited
UNITED STATES PATENTS 2,951,599  9/1960  Bogar.............................. 214/16.1 C
3,497,087  2/1970  Vita............................... 214/16.1 CB

FOREIGN PATENTS OR APPLICATIONS 545,128  6/1956  Italy............................ 214/16.1 DC Primary Examiner—Robert J. Spar
Assistant Examiner—Lawrence J. Oresky

[57] ABSTRACT

A hydraulic motor system mechanism for driving a member selectively in opposite directions and to either of a pair of positions in either direction. The mechanism comprises two pairs of double acting hydraulic cylinders with interconnecting piston rods, whereby selective pressurization of a cylinder of either pair of said cylinders effects movement of the member in one direction to a first position and pressurization of the other cylinder of the pair effects movement to a second and further position in the same direction. Pressurization of one or both cylinders of the other pair effects movement of the member to a first or second and further position in an opposite direction.

8 Claims, 23 Drawing Figures

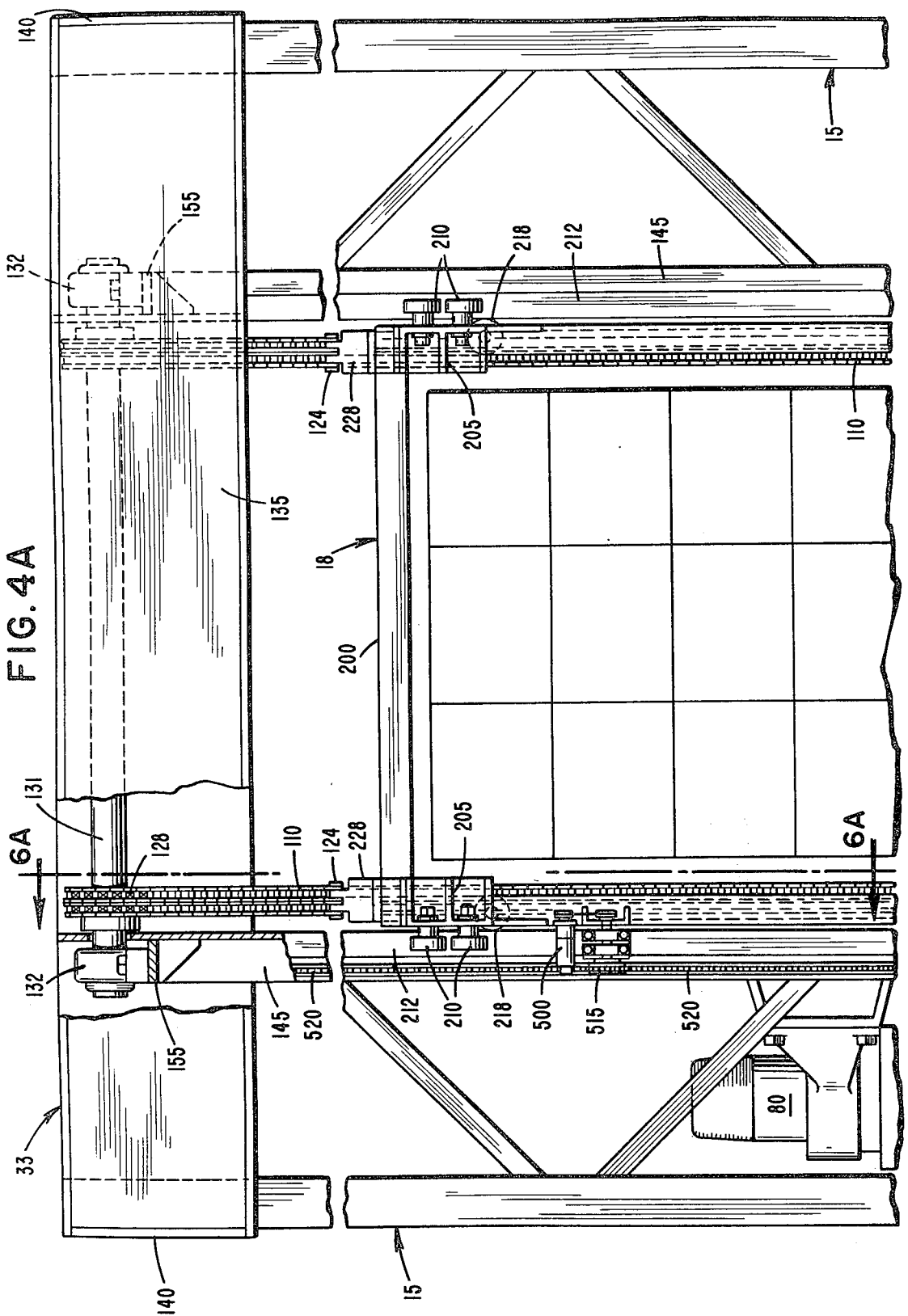

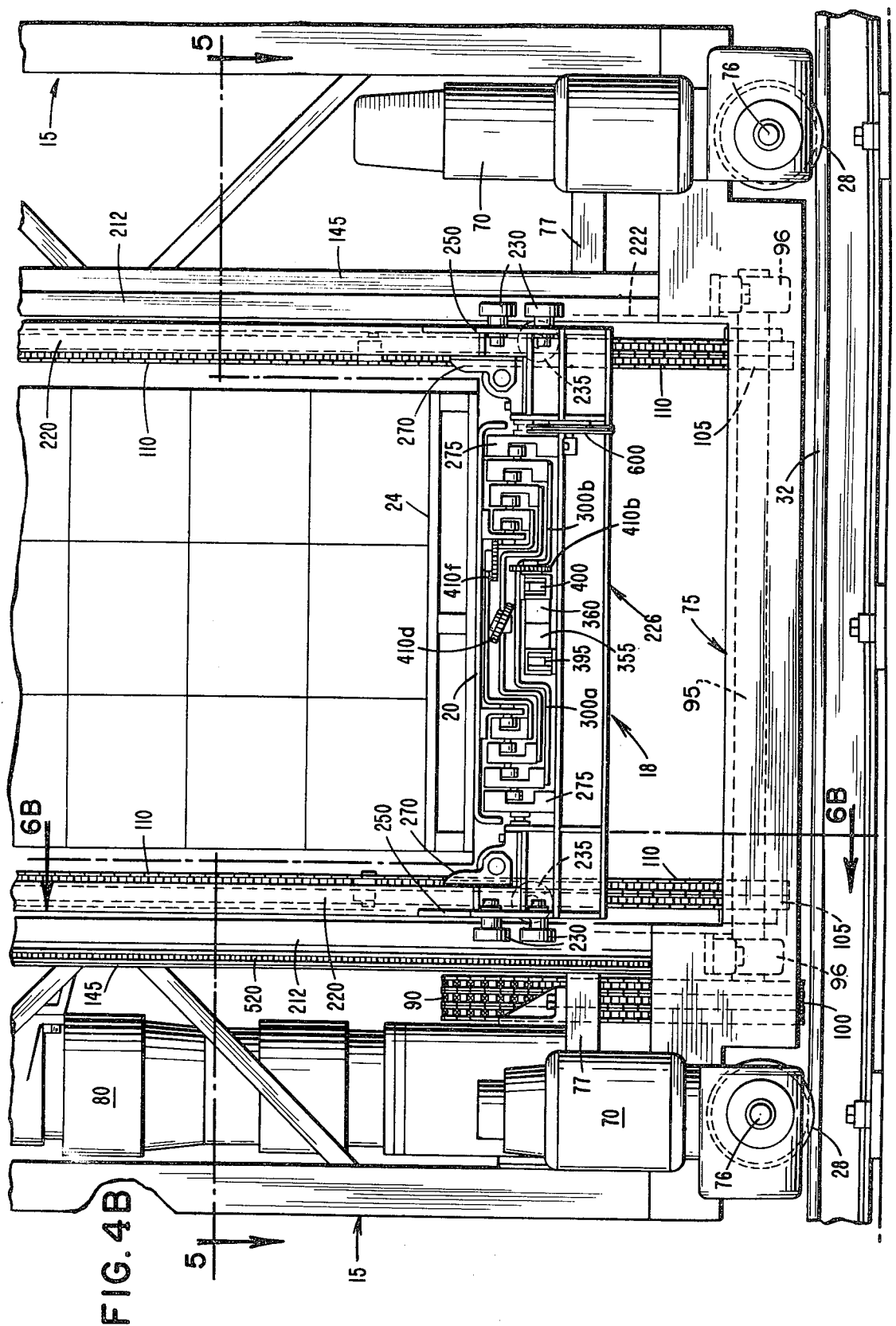

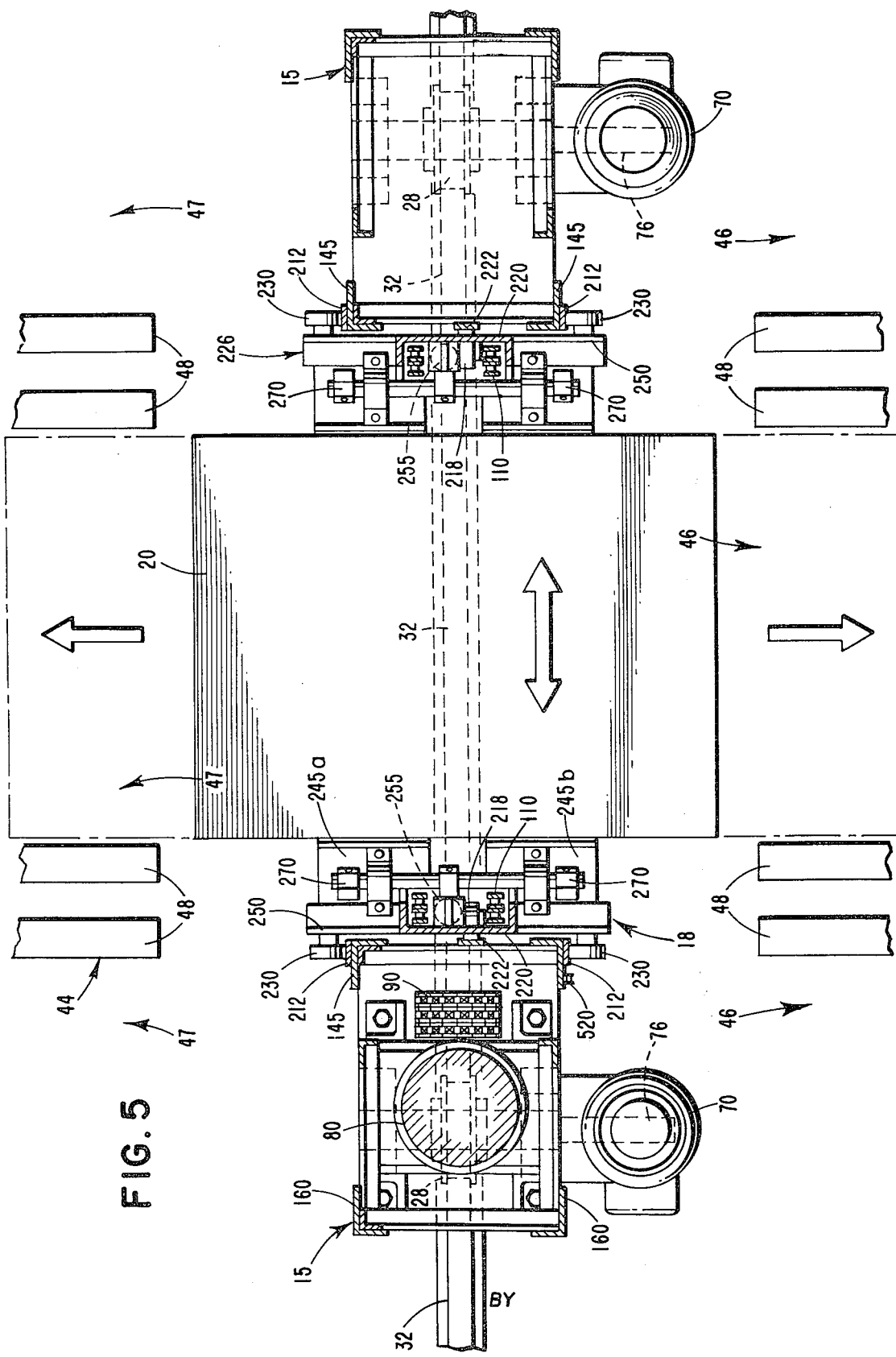

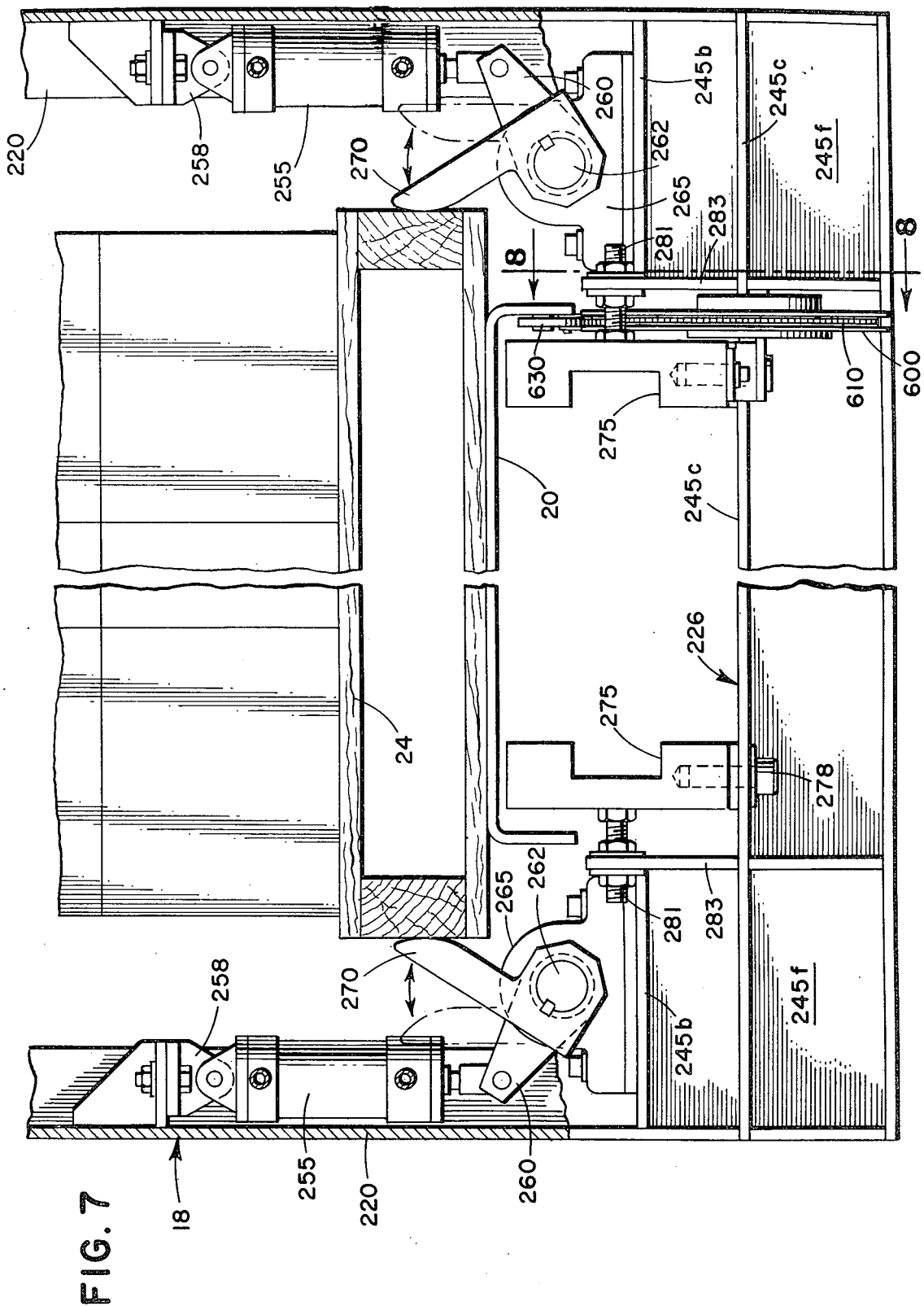

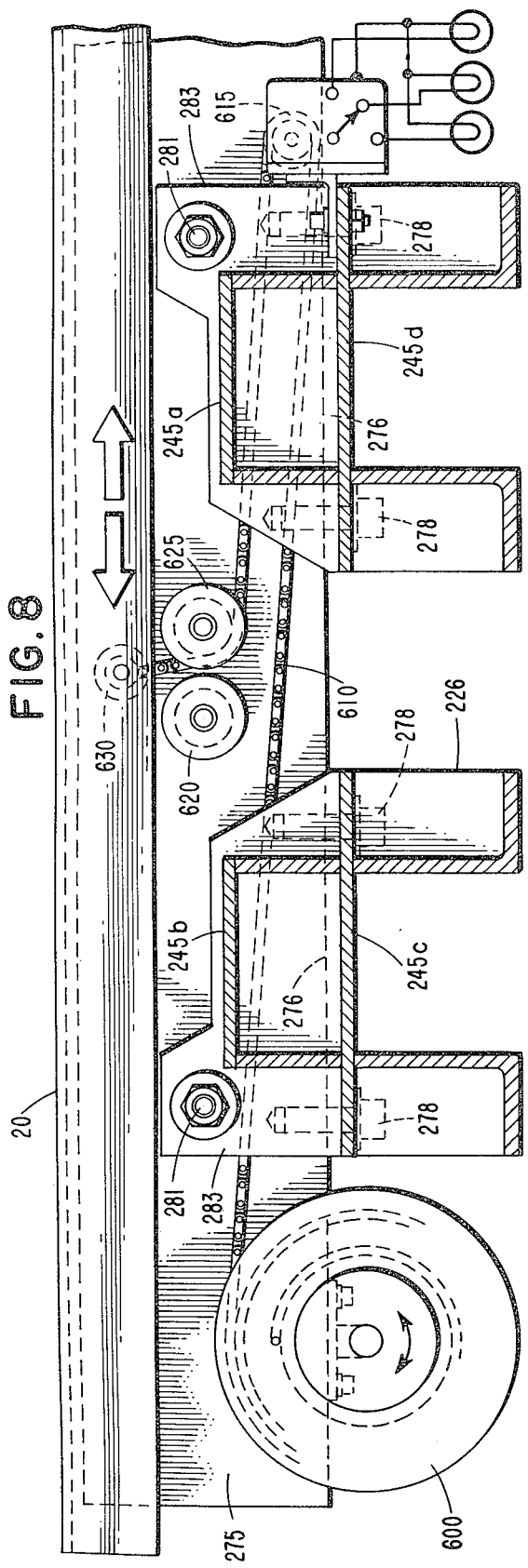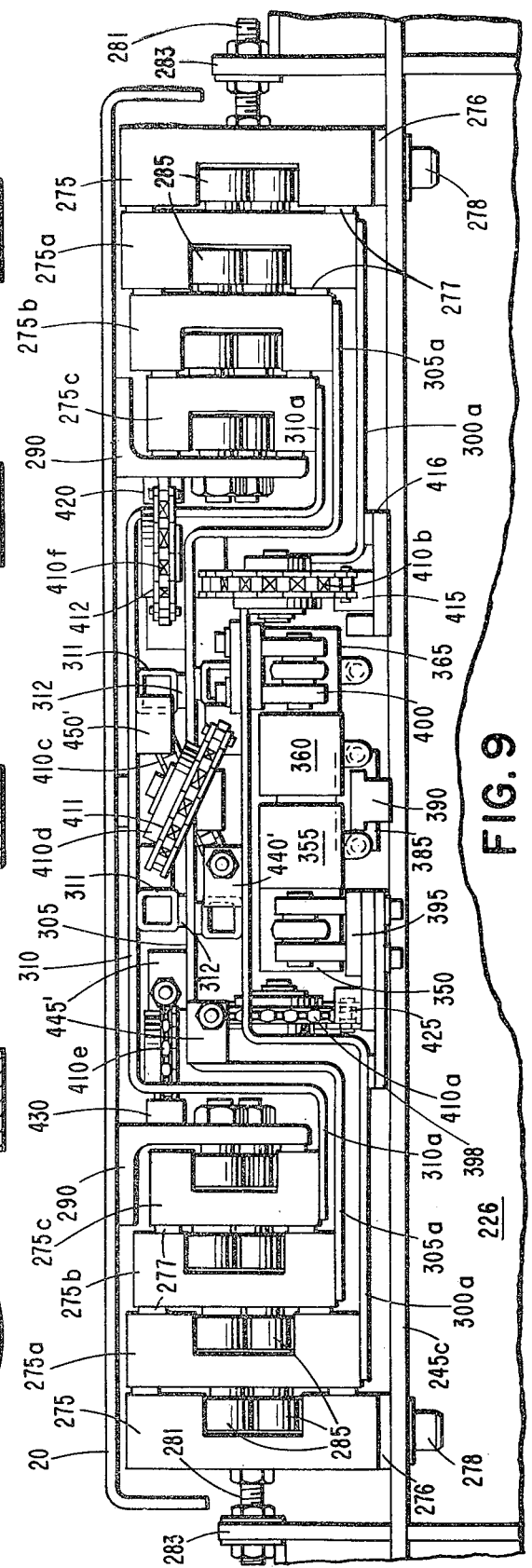

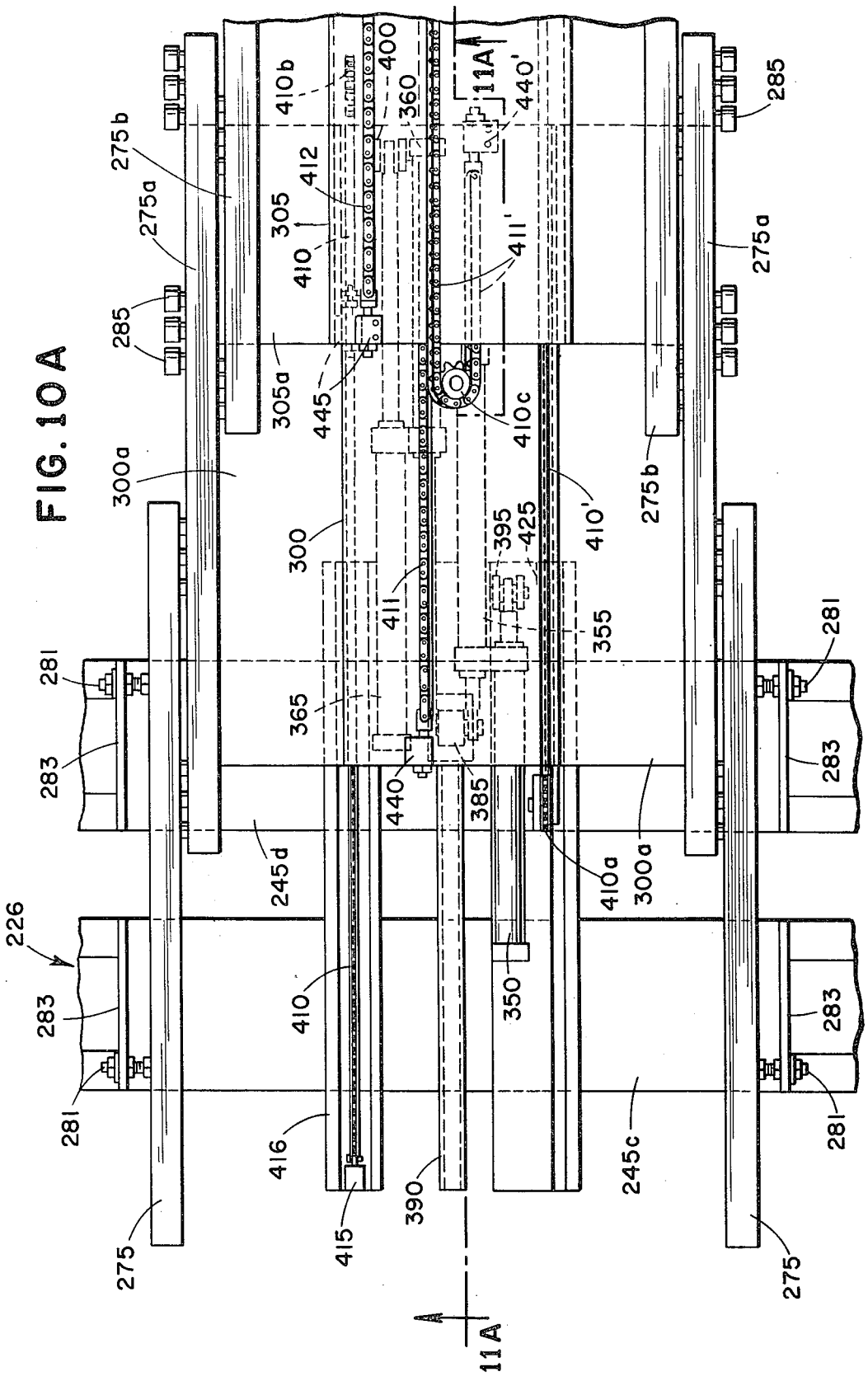

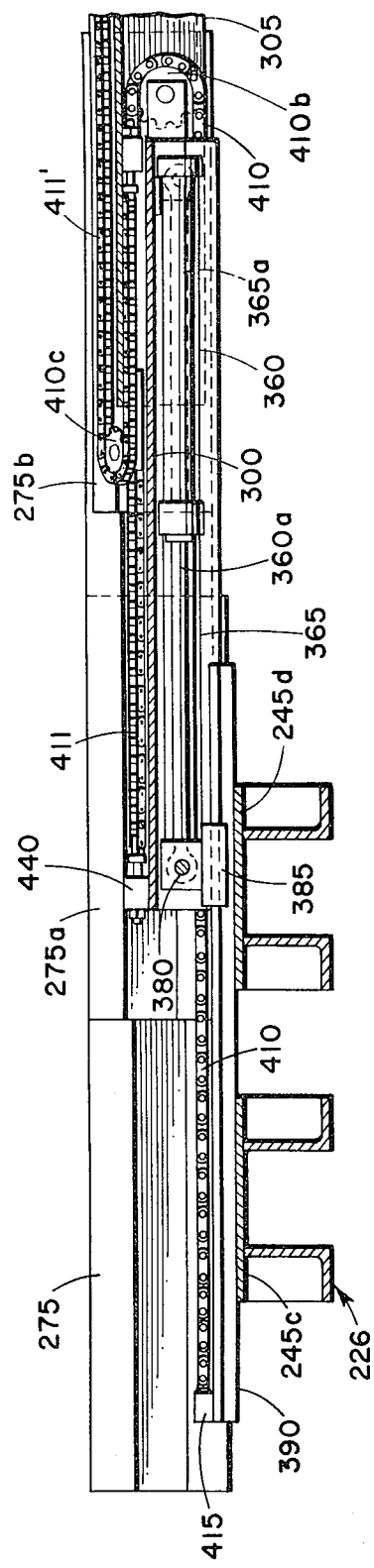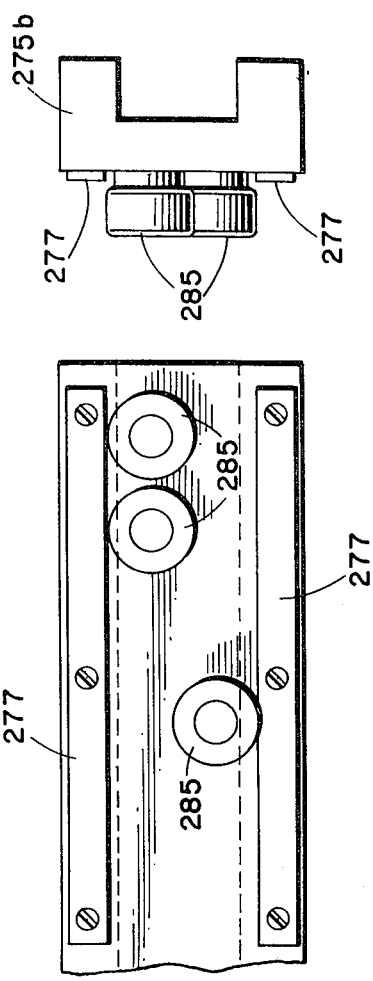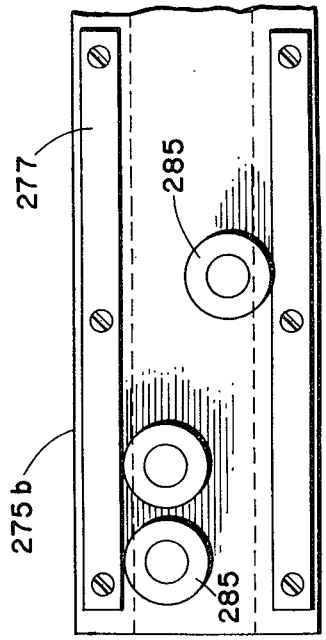

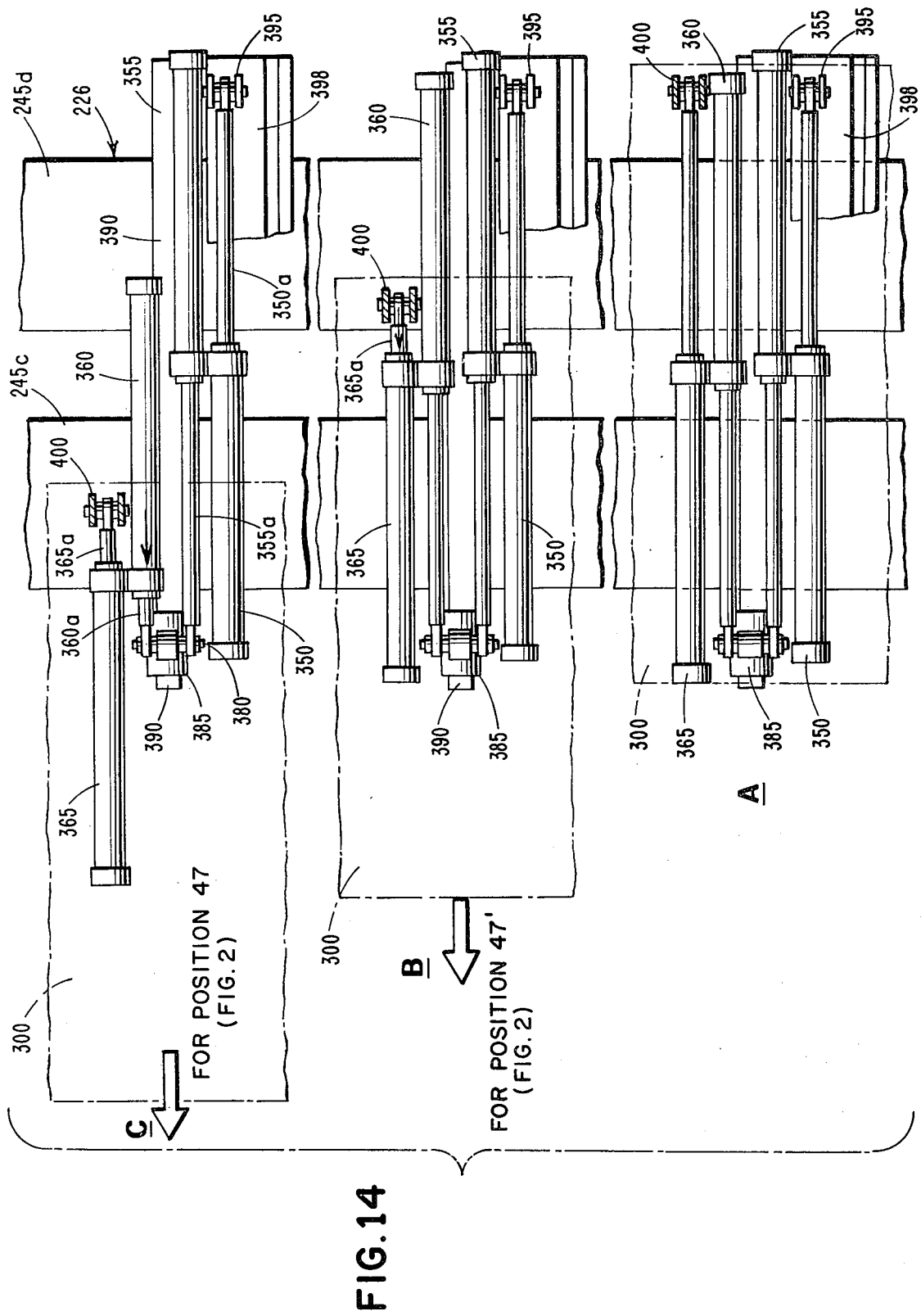

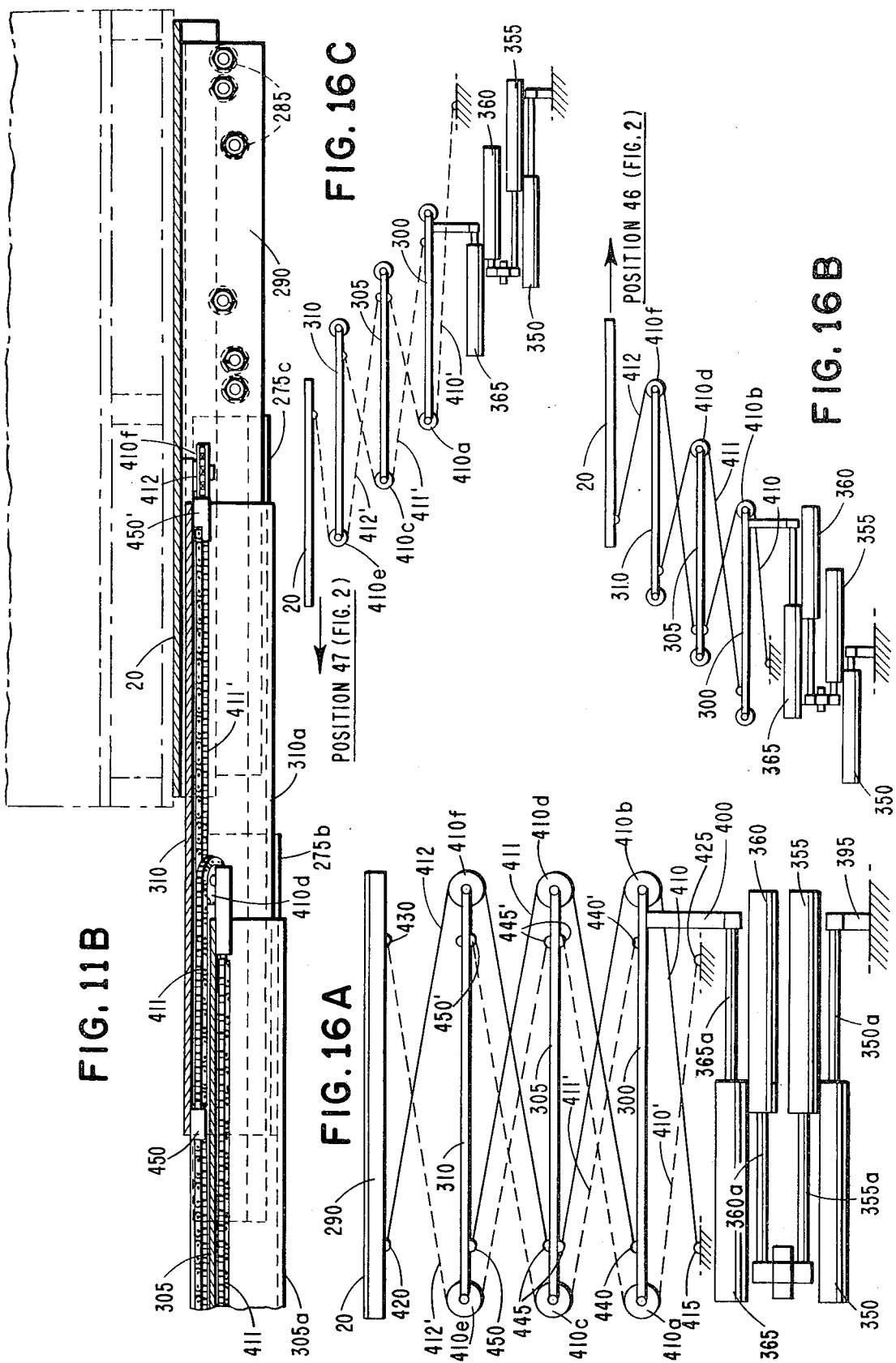

HYDRAULIC MOTOR SYSTEM

This application is a division of Ser. No. 198,917, now U.S. Pat. No. 3,792,758, filed Nov. 15, 1971, in turn a continuation of Ser. No. 840,667, filed July 10, 1969, now abandoned.

Reference is made to corresponding divisional applications Ser. No. 314,146, filed Dec. 11, 1972 and Ser. No. 314,159, filed Dec. 11, 1972.

Briefly the invention contemplates a roller mounted tower comprising a pair of spaced columns, intermediate spacing having an elevator in which a tray is disposed and supported for reciprocal vertical movement driven by a sprocket chain arrangement for raising or lowering cargo laden pallets. The tray is mounted on a telescopic transport mechanism for sliding movement to either side of the tower from a retracted or neutral position so as to insert or remove cargo laden pallets relative to storage grids at selected positions, i.e., cells in the grids. The invention can be used with manual, semi-automatic, or fully automatic control. The transport mechanism can extend the tray to either of two distances or pallet positions to either side of the tower so that storage grids of double depth cell construction at the same level on each side of the tower can be served.

The device is capable of handling very heavy loads albeit with a telescopic tray transport which is relatively flat and compact, comprising a combination of telescopic cantilever beams and four hydraulic cylinders coupled to each other in a novel manner and to a drive member. Such drive member is coupled to a series of telescopically arranged drive members, coupled by flexible member, e.g., sprocket chain arrays in such a manner that hydraulic actuation of the first drive member causes an additively increased actuation of the series for telescopically extending the drive members. The combination of actuations effects a telescopic movement of the drive members and of the beams to transport of the pallet laden tray. Such telescopic coaction in simultaneous and reversible so as to move the tray to either side of the tower, and control of the hydraulic cylinder actuation can effect a half or full distance of tray movement to utilize double depth storage cells for handling two pallets to a cell.

The drive members all nest within each other to form a compact structure, but are not subject to cargo load nor weight stress. Such weight stress is borne by the beams distributed at both sides of the nested drive members and substantially in the same plane to effect compactness. A first pair of beams is secured to the tower frame while a final pair is secured to the tray. Intermediate pairs articulate the first and final pairs thus described, for reversible telescopic load supporting effect on either side of the tower. The load carrying beams slide with respact to each other on intermediate roller bearing arrays.

The tower is driven on a track intermediate the storage grids, there being two rollers supporting the tower each independently driven by an electric motor. Accordingly, very tall towers can be utilized, albeit the higher the tower, the higher the center of gravity. Thus, a lessening of traction of either roller due to forward or rearward pivotal forces on the tower about a roller caused by deceleration or acceleration will not affect drive of the tower since one roller or the other will inherently have traction increased when traction of the other is decreased.

A detailed description of the invention now follows in conjunction with the appended drawing, in which;

FIG. 4A is a front elevation of the upper construction of the tower;

FIG. 4B is a continuation of FIG. 4A showing the construction of the lower portion of the tower;

FIG. 5 is a section generally through 5—5 of FIG. 4B;

FIG. 7 is a front elevation showing details of the fingers of a mechanism for horizontally aligning pallets on the tray so as to be centralized thereon;

FIG. 8 is a side elevation of the tray on line 8—8 of FIG. 7 showing the tray position indicator assembly;

FIG. 9 is a front elevation of the tray showing the relationship of the telescopic drive members, support channels, support rollers and chain and hydraulic drive mechanism;

FIG. 10A is a fragmentary plan view showing the telescopic mechanism for the tray in transported, i.e., extended condition;

FIG. 11A is a section through 11A—11A of FIG. 10A;

FIG. 11B is a section through 11B—11B of FIG. 10B;

FIG. 12 is a side elevation of the support roller layout on a slide beam of the tray transport mechanism;

FIG. 13 is an end view of one of the support beams of the telescopic transport mechanism;

FIG. 14 is a plan view of the hydraulic system comprising respective pairs of articulated cylinders for actuating the tray in respective directions transversely of the tower wherein the sub figures A, B, and C show progressive extension of a drive member as certain cylinders are pressurized for transport of the tray toward the left;

FIG. 16 is a diagram of the chain drive of the tray wherein sub figures A, B, and C show central position and full left and right extensions, respectively.

GENERAL DESCRIPTION

Figure 1:
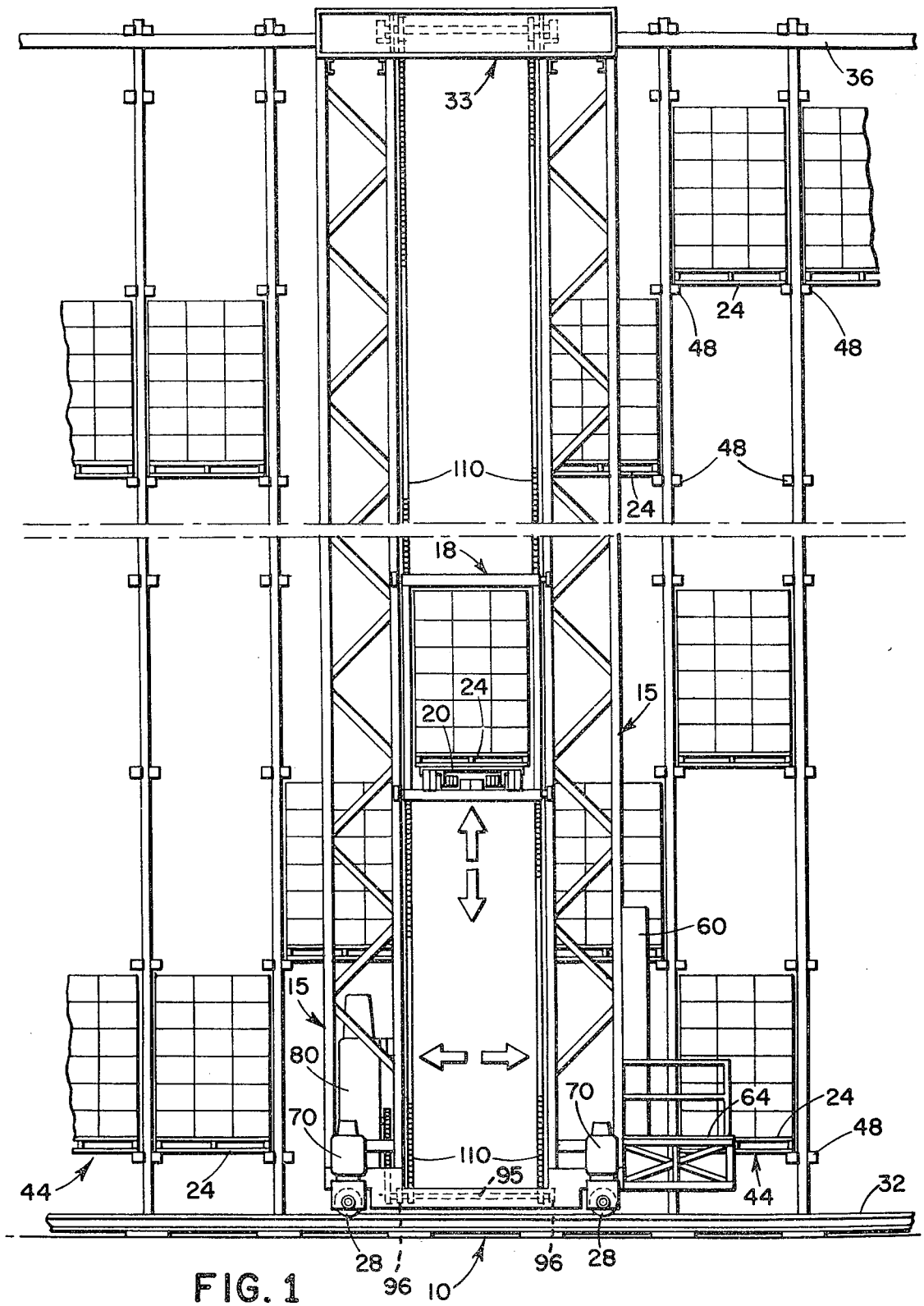
FIG. 1 is a front elevation showing the horizontally movable tower and the vertically movable elevator for carrying a tray in relation to the cells of a structural storage grid at one side of the track on which the tower rolls, the tray being extensible towards and away from the plane of the paper.

Referring to FIG. 1, the invention comprises a tower 10 having a pair of structural columns 15 built up of corner angle irons and diagonal cross braces as generally illustrated and supporting for vertical movement a pallet carrier or tray elevator 10 comprising a tray 20 and capable of vertically lifting pallets 24 carrying, e.g., boxed merchandise as illustrated, the vertical arrows indicating the reverse directions of motion of the elevator. The tower is movable reversibly as indicated by the horizontal arrows, being supported as a roller 20 under each column, which rollers travel on a track 32. The lower end of the tower is thus supported and guided on track 32 while the upper end frame 33 of the tower (FIG. 6A) is guided by an angle iron member 36 between guide rollers 30 (FIG. 2) carried by the tower on arm 39.

Figure 2:
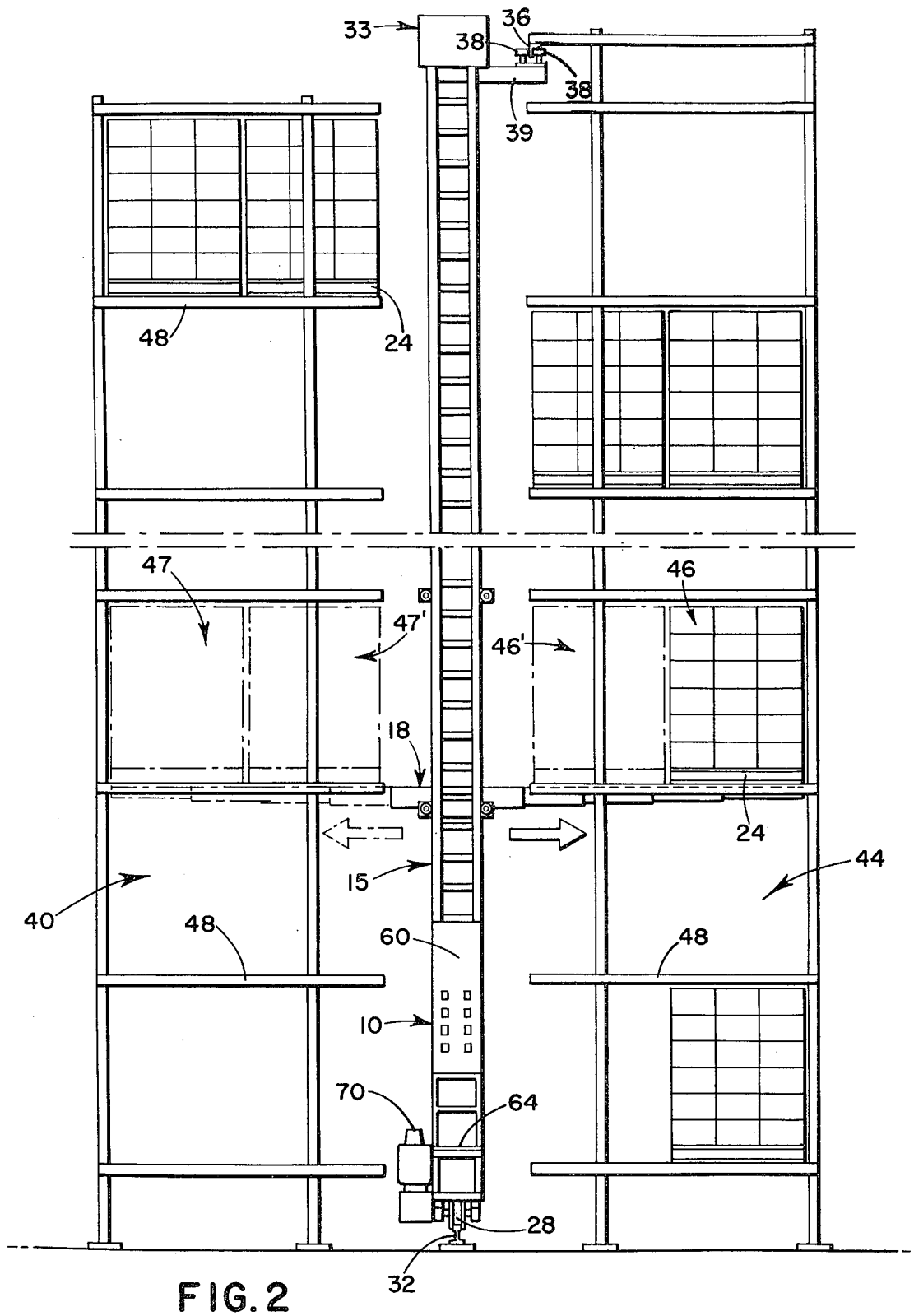
FIG. 2 is an end elevation of a tower between a pair of storage grids showing the reversible direction of motion of the tray elevator, the tower being movable toward and away from the plane of the paper.
Figure 3:
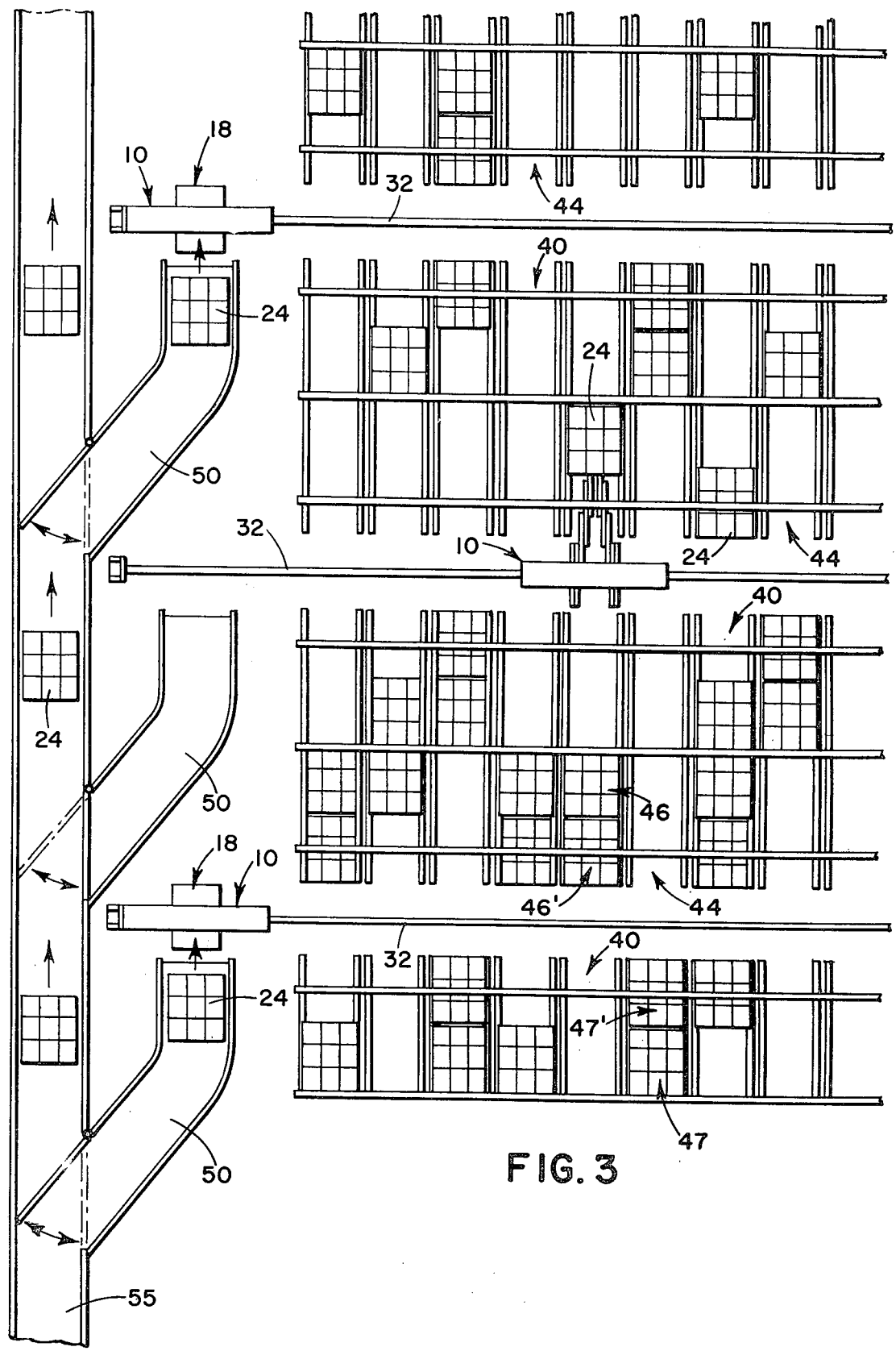
FIG. 3 is a plan view of a storage system having a plurality of towers in movable and parallel array with an infeed conveyor.

Referring to FIGS. 2 and 3, the tower rolls between storage grids 40 and 44 made up of structural members in cellular construction in a known manner.

A grid 40 and a grid 44 can be assembled back to back to effect a plurality of bays as illustrated in FIG. 3. Each cell can be double depth horizontally to hold two pallets 24 as illustrated in FIG. 3.

As seen in FIG. 2, tray 20 is extended toward the right for the purpose of moving a pallet 24 containing a load of cartons to be deposited in a cell at 46. Extension of the tray is indicated in solid lines, the cargo being stored at the full horizontal depth of the cell, i.e., towards the rear. Another pallet as indicated in phantom at 46' is stored at the front. Obviously, the same extension of the tray can be used for lifting to retrieve a pallet and its cargo. Likewise in FIG. 2, the position of cargoes at 47 and 47' (in phantom) to the left illustrates the reversible movement of the tray 20 as indicated by the dotted arrow.

Thus the tower can move horizontally into alignment in any desired location between a pair of storage grids and the tray elevator can then move vertically. Subsequently the tray can move transversely horizontally toward or away from the storage grids for depositing or retrieving loads. Obviously, vertical control of the tray elevator is such as to place the tray initially slightly above the spaced cell beams 40 in inserting a pallet and slightly below for withdrawal, final vertical movement of a couple of inches then being had to rest the pallet or lift it. The tray is slightly narrower than the distance between beams 40 as noted in FIG. 5.

The members 40 are support rails on which pallets are stored, and are spaced apart a sufficient distance for tray clearance in moving up or down between them.

FIG. 3 shows a schematic layout whereby the invention can be used for a plurality of storage grids back to back, with a track 32 intermediate such grids 40 and 44 formed in bays and each track being served by a diverter chute 50. Thus, a series of diverter chutes such as 50 are spaced along an infeed conveyor 55 and the diverter device 50 can divert cargo carrying pallets 24 to any chute 50 in accordance with manual or automatic control.

Referring again to FIGS. 1 and 2, the tower carries a control panel 60 and a platform 64 on which an operator may stand for manual control of the tower and tray. The tower and tray may likewise be controlled by automatic electronic means from a remote console by conventional equipment, or by computer programming.

Figure 6A:
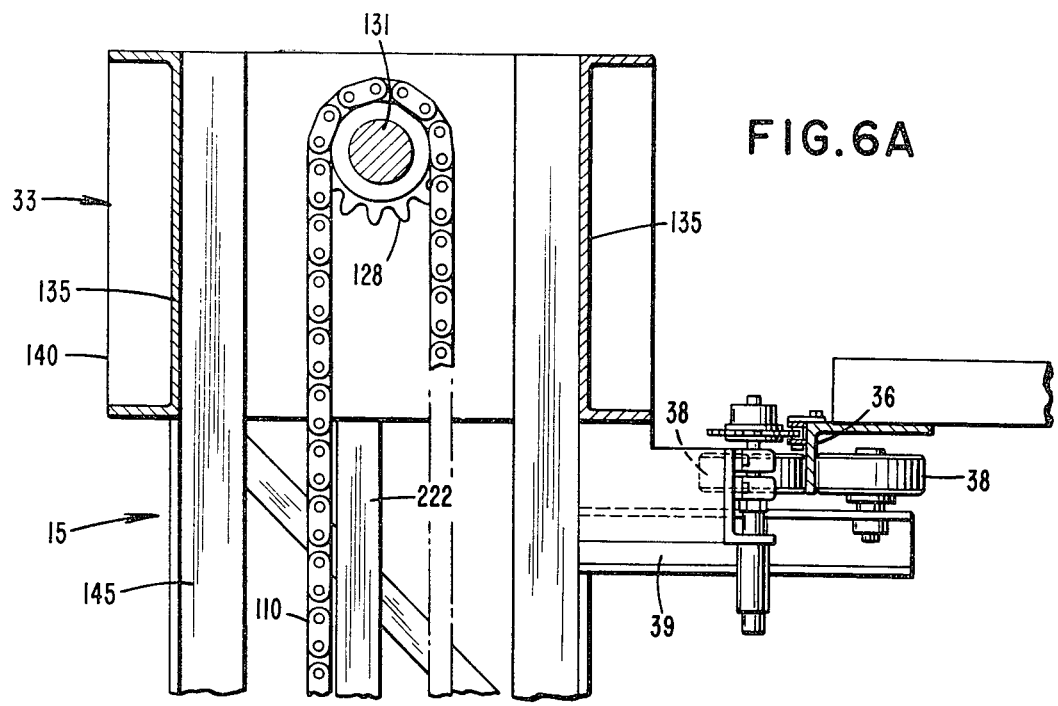
FIG. 6A is a vertical section through 6A—6A of FIG. 4A.
Figure 6C:
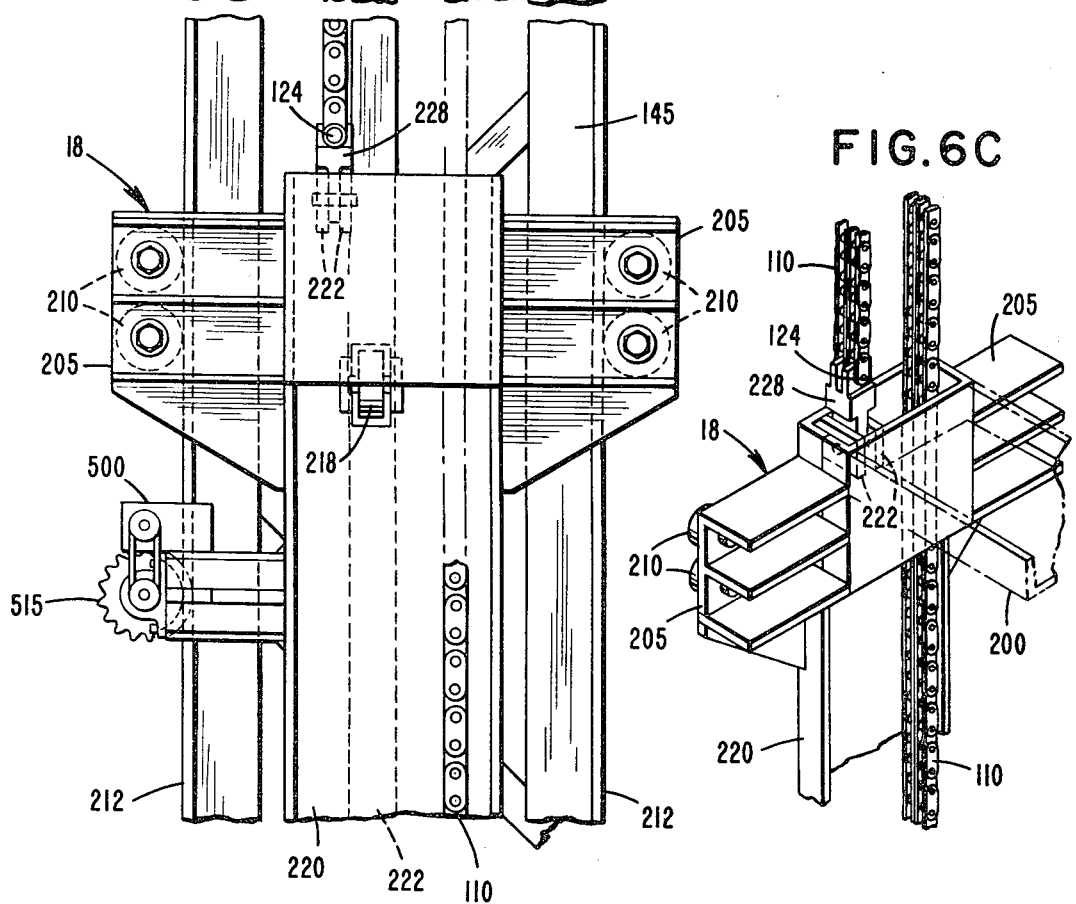
FIG. 6C is a fragmentary perspective of an upper corner of the tower.
Figure 6B:
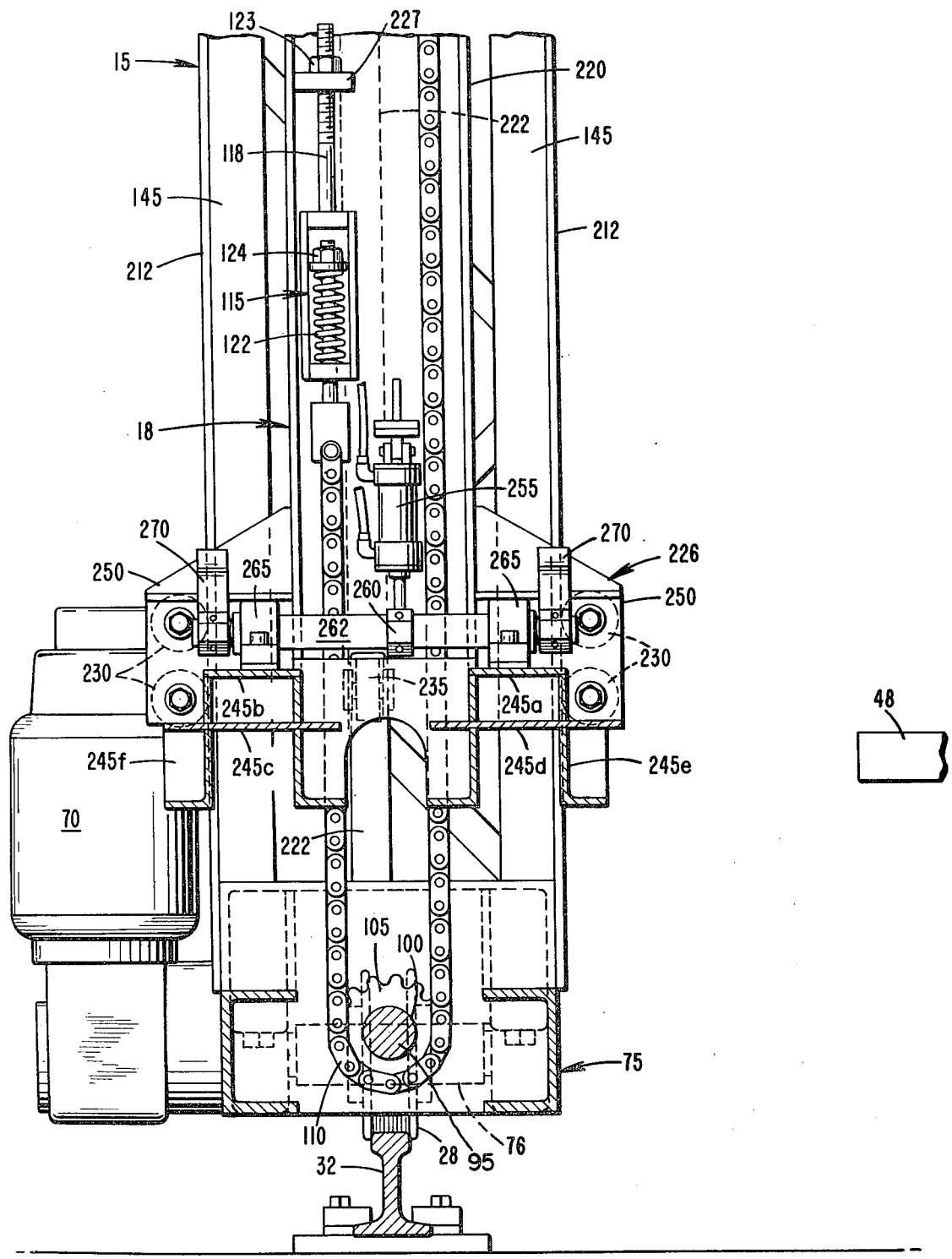
FIG. 6B is a vertical section through 6B—6B of FIG. 4B.

Power for motivating the tower is derived from a pair of motors 70 (see FIG. 4D) each driving a flanged roller 28 on track 32 via conventional reduction gearing, the motors, rollers and gearing all being supported by the roller shafts 76 with bracing 77 to the columns, FIGS. 4B, 5, and 6B.

The base frame 75 may be made up of welded plates and structural members as illustrated, in any conventional manner.

Referring to FIG. 1, it will be appreciated that the tower can be of any desired height. However, the taller it is the higher the center of gravity. This is especially true if the tray elevator 18 is at some elevated level, and cargo loaded, when the tower is moving in either direction on track 32. Accordingly, assuming that the tower is starting to move from a standstill position, going to the left, the acceleration force will cause a reduction of traction on the left hand roller. However, load remains on the right hand roller for traction effect. Similarly, when the tower slows down, the deceleration causes lessening load on one or the other roller, depending on direction, and braking effect is then applied to the more heavily loaded roller. Therefore, by providing a separate motor 70 for each roller, the traction differential is minimized. Where a tower is set in motion or slowed down with a simultaneously rising load in the tray elevator, the advantage of the independent motor or arrangement is apparent.

The tray elevator motor 80 (FIGS. 4B and 5) is carried by the base frame 75 of the tower and as in the case of the tower drive motors 70 is disposed on a vertical axis, driving the multiple sprocket chains 90 for rotating a shaft 95 having a gear 100 at theleft end of the shaft as shown in FIG. 4B which will be understood to mesh with the lower loop of the chains 90.

The shaft 95 (FIGS. 4B and 6B) has a pair of gears 105 at respective ends keyed thereto around each of which is a tray lifting chain 110. The chains 110 each terminate at their lower ends through a spring tensioned connection 115 (FIG. 6B), being thus fastened to the frame of tray elevator structure 18 through the take up bolt 118 and a spring 122. The frame of the tray elevator will be later described. By taking up on a respective bolt via the nut 123 (FIG. 6B) chain wear elongation is compensated. Elongation due to load variation is compensated by respective springs 122, adjusted by nut 124. The other ends of the chains 110 (FIGS. 4A, 6A) are ultimately secured at respective points 124 to the tray structure 18 as later described. Chains 110 pass upwardly to the top frame 33 of the tower and around idler gears 120 carried on a shaft 131 having suitable bearing blocks 132 in a box like structure comprised of heavy longitudinal beams 135 which form the rigidifying top frame 33 (FIG. 4A) in conjunction with equally heavy transverse channels 140, for the columns of the tower. The bearing blocks 132 rest on the inner vertical structural iron angle members 145 of the columns 15 (FIGS. 4A, 6A, 6B) specifically on cross brackets 155.

From the foregoing description it will be understood that energization of motor 80 will raise or lower the tray elevator 10 via chains 110 dependent uopn direction of motor rotation (FIGS. 1, 2, 4B, 6A, 6B) drive being had via chains 90 and shaft 95 and associated gears so that both sides of the tray elevator 10 have lifting force applied thereto at the respective connections 224, FIG. 6A.

THE TRAY ELEVATOR

Referring to FIGS. 4A, 4B, 5, 6A, 6B, 7 and 8, the tray elevator 10 comprises a frame having a top beam 200 (FIGS. 4A, 6A) extending between tower columns 16 and secured at its ends on the back of a short channel 202. A pair of transverse beams (FIG. 4A) or channels 205 carry transverse guide rollers 210 that ride (FIG. 4A) on vertical members 145, on tracks 212 welded thereto. The construction is symmetrical at both ends of beam 200. A longitudinal guide roller 210 is carried at each side of the tray elevator in a respective vertical frame channel 220 which form the sides of the elevator frame structure and which are secured at their upper ends to respective pairs of beams 205. Rollers 218 ride on fixed vertical guide bars 222 (FIGS. 5, 6A) intermediate members 145.

The side frame members 220 are secured at their lower ends to the elevator base frame 226 FIGS. 4B, 5, 6B) and the upper flange edges are welded to the flange edges of short channels 202 to form openings for chain passage and the plates 222 welded therein which form end chain and fastenings at 124 (FIG. 6A).

As seen in FIG. 6B the lower ends of chains 110 (one shown) are secured via bolts 118 as heretofore mentioned, passing through cars 227 welded inside channels 320.

The construction is symmetrical as far as the guide roller arrangement at top and bottom (FIGS. 4B, 6B) of the tray elevator is concerned in that guide rollers 230 at the sides of column members 145 are similar to rollers 210. Also, guide rollers 235 are similar to rollers 210, provided to roll on bars 222.

The elevator base frame 226 (FIGS. 4D, 5, 6B, 7, 8) comprises a box beam construction shown in transverse section in FIGS. 6B and 8 and in full line front elevation in FIG. 7, being built up of plates such as 245a, 245b, 245c, 245d, and channel members 245e, 245f in a rigid welded construction suitable for load support. Other types of frame construction can, of course, be used.

The plates 245c and 245d extend longitudinally across the frame 226 construction (FIGS. 7, 9 10A, 11A, 14, 15) at a central area as a main support for the tray transport mechanism later described.

The side channel members 220 are secured at respective sides of the base frame 226. The webs of such channel members 220 form the lateral side walls of frame 226 to some extent by being coplanar with angle iron members 250 (FIG. 5) which carry rollers 230.

The construction permits lift chains 110 to be nested within the flanges of the side channel members 220 as seen in FIG. 5. Also nested within such flanges are hydraulic cylinders 253 (FIGS. 5, 6D, 7) pivotally secured to the webs at 258 and having rods articulated via levers 260 to respective shafts 262 having bearing support as by pillow blocks 265 secured to respective cross plates 245a and 245b of the elevator base from 226. The shafts are on respective sides of tray 20 and each has a pair of spaced fingers 270 (FIGS. 6B, 7) which are thus rockably actuated upon the pressurizing of cylinders 255 to engage the sides of pallets such as 24 in order to center the pallets on the tray 20. The fingers move in unison to the same predetermined inner limits, e.g., as may be provided by identical positioning of identical cylinders 255 and full movement of the piston rods, in the instant case such movement being one of retraction.

THE TELESCOPIC TRAY TRANSPORT

Referring to FIGS. 7, 8 and 9, the plates 245c and 245b support heavy cantilever channel beams 275 on spacers 176 and secured by bolts 270, provided in plurality (FIG. 8), and these beams will be understood to be thus fixed to elevator frame 226. Lateral adjustment bolts 201 provided on side plates 283 secured to the frame 226 effect alignment and parallelism of beams 275.

Figure 10B:
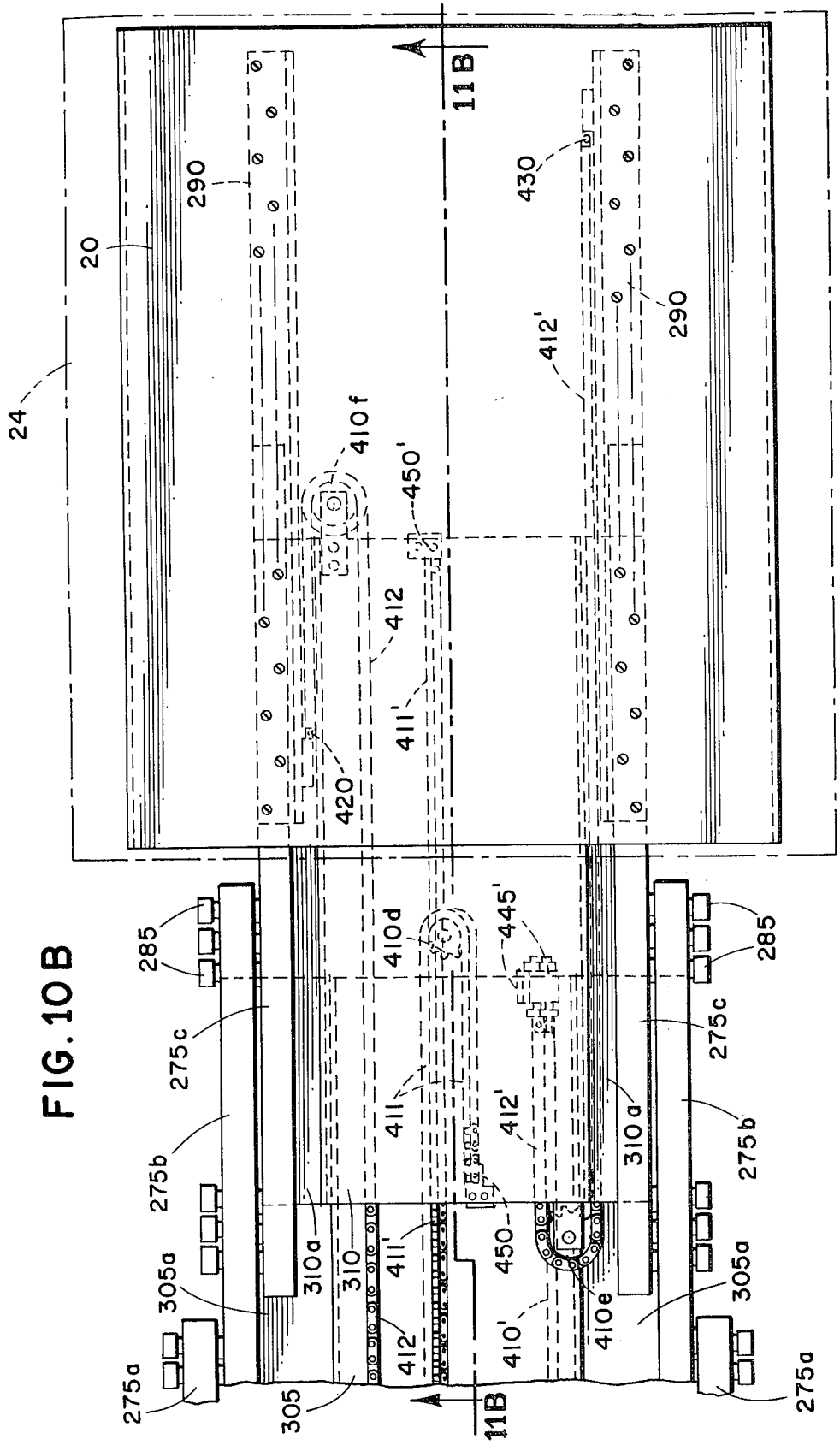
FIG. 10B is a fragmentary plan view which is a continuation of FIG. 10A showing the remainder of the telescopic transport mechanism with the tray supported at the end thereof fully extended outwardly for depositing a pallet in a storage cell, lifting a pallel out of a cell.

Referring to FIGS. 9, 10A and 10B, three additional pairs of channel beams 275a, 275b, 275c similar to beams 275 are provided, all coplanar and of progressively smaller size, but all cantilever load carrying beams telescopically connected with each other and ultimately with beams 275, including a final pair of channel beams 275c of smallest size.

Slide bearings 277 (FIGS. 9, 12) are secured to the beams for case of sliding engagement and precise spacing.

All such beams except 275 carry groups of rollers 285 (FIG. 12), three rollers to a group, four groups to a beam, which rollers ride the upper and lower surfaces of the channel of the adjoining beam (FIG. 9).

The innermost pair of channel beams 275c carry angle iron beams 290 to which tray 20 is secured (FIGS. 9 and 10B). Such support of beams 290 are likewise by groups of rollers 205.

It will be apparent from consideration of FIGS. 10A and 10B that the tray 20 is supported for horizontal reversible movement away from and back to or through the tower (as represented by plates 245c and 245d) wherein the tray can extend to either side of the tower to the maximum distance provided within predetermined limits, due care being had to provide proper support by two roller groups 285 for all beams within adjoining channels at maximum extension in either direction.

The driving mechanism for tray 20 for reversible motion away from and back to or through the tower comprises three nested drive members or plates 300, 305, 310 (FIGS. 4B, 9, 10A, 10B, 11A, 11B). As seen in FIG. 9, the drive members are nested channel shaped plates having progressively wider horizontal flanges and spaced vertical flanges as well as vertically spaced horizontal webs. The horizontal flanges of each drive plate are secured to the lower surfaces of a pair of channel beams. Thus, flange pairs 300a, 305a, 310a are secured to beam pairs 275a, 275b, 275c, respectively, (FIG. 9).

The drive plates may be secured to the beams by bolts (not shown) or in any other suitable manner, and are thus carried by the beams. Bracing tubes 311 which have slide bearings 312 are welded to plates 305 and 310.

The drive plates are telescopically movable with respect to each other, the innermost plate 300 being driven hydraulically. Plates 305 and 310 are chain driven from plate 300 as is tray 20 via angle iron beams 200, in a manner to be described.

Referring to FIGS. 10A, 11A, 14 and 15, the hydraulic drive for plate 300 comprises four double ended cylinders 350, 360, 365 (FIG. 14). Cylinders 350 and 355 are welded at their rod ends to each other, at 370, as are cylinders 360 and 365 welded at 375. The piston rods 355a and 360a of cylinders 355 and 360 are pivotally connected to each other by a pin 300 having bearing support on a T-slide guide block 305. A T-slide guide bar 390 (also see FIG. 10A) is secured to fixed cross plates 245c and 45d being thus rigidly secured horizontally to the elevator base frame 226. Rod 350a of cylinder 350 is pivotally secured at 395 to cross plate 245c via plate 398 secured to plate 245c (FIG. 14) and is thus fixed to provide reaction support (FIG. 9). Rod 365a of cylinder 365 is pivotally secured at 400 (FIG. 9) to drive plate 300.

The four cylinders are carried in a common plane and thus float as an integral assembly having pivotal securement to the frame 226 of the tray elevator (via the cross plates 245c and 245d) and the innermost drive plate member 300, as described.

In FIG. 14, a neutral position A with all rods extended is shown wherein the cylinders are under pressure at one side to hold such position locked and drive plate 300 (and tray 20) is centered between the tower columns (FIG. 5). For such purpose hydraulic blocking is possible but positive pressure is preferred. However, in FIG. 14 the result of pressurizing by valving (not shown) the right end of cylinder 365 is noted in position D; rod 365a has been shifted to the left (see arrow) carrying plate 300 with it to the left toward an intermediate position away from the tower. This would be the position for moving tray 20 into the first half of the full horizontal depth of a cell, e.g., to first pallet position 47' of FIG. 2. This is possible because of the reaction support at 395 and by maintaining all pistons (not shown) of the cylinders hydraulically blocked or pressurized against movement except for the cylinder being pressurized. If full tray movement, e.g., to second pallet position 47 (FIG. 2) is to be had, then simultaneously with the pressurizing of cylinder 365 the left end of cylinder 360 is pressurized, rod 360a remains stationary (cylinders 350 and 355 blocked) but the cylinder 360 shifts to the left (see arrow) carrying cylinder 365 with it to the left since they are welded together. This causes continued shifting of rod 365a additively to the left. The position of plate 300 is thus to its maxium shift leftwards as shown in position C via rod 365a and connection 395.

Figure 15:
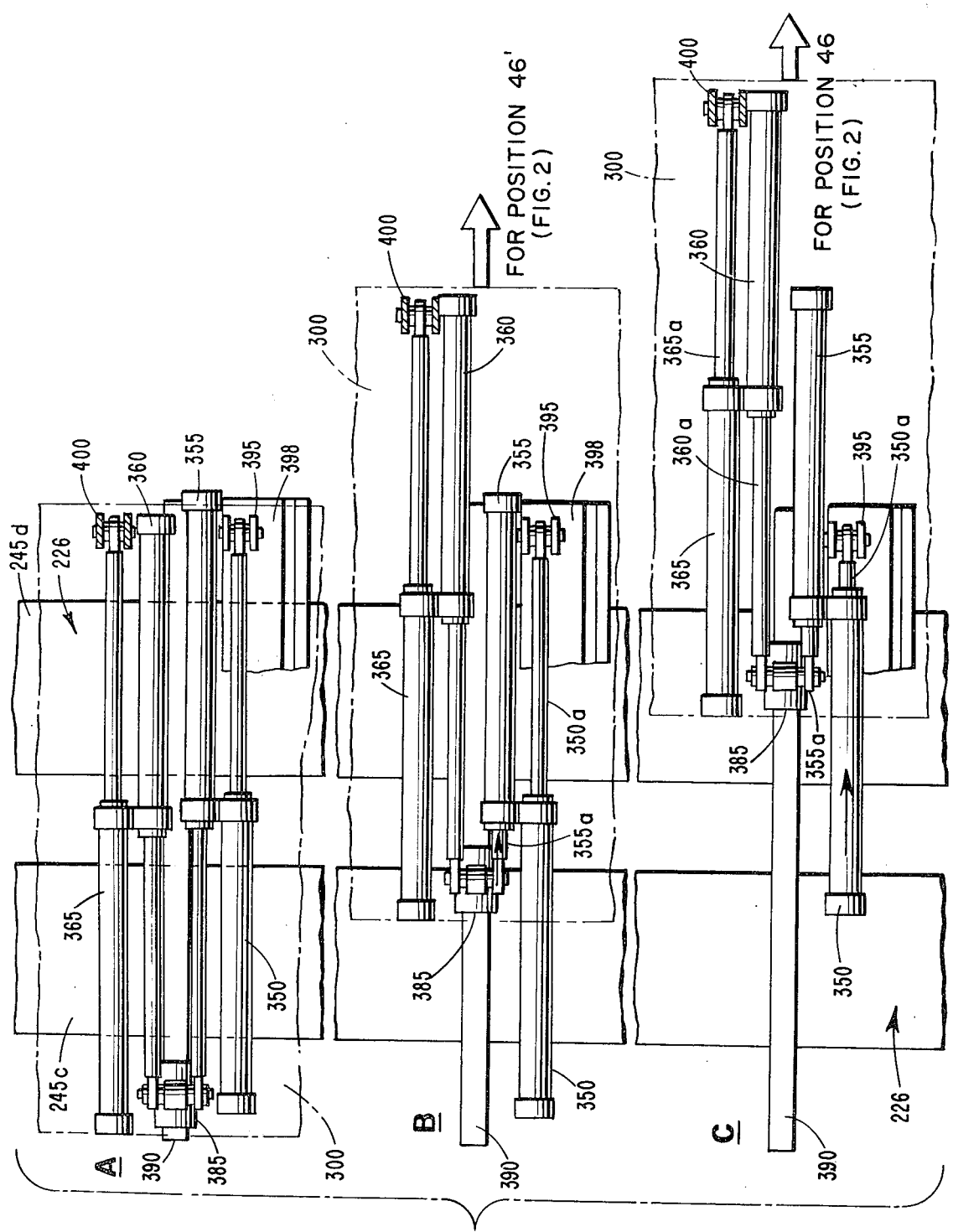
FIG. 15 is a view similar to FIG. 14, but wherein the sub figures illustrate the progressive drive member positions A, B and C away from the tower wherein the cylinders are pressurized for extension to the right.

Referring now to FIG. 15, position A of the hydraulic system again shows the neutral position, with centralized drive plate 300. However, by pressurizing the left end of cylinder 355, rod 355a moves to the right (see arrow) into cylinder 355, pulling rod 360a via pin 330 and T-slide 305 therewith. Rod 360a is hydraulically blocked in cylinder 360 and therefore pushes that cylinder along with attached cylinder 365 and its hydraulically blocked rod 365a to the right. Plate 300 is thus moved to the right as illustrated in position B for a movement of tray 20 to position 46' of FIG. 2. However, a simultaneous movement added thereto can be effected by pressurizing the right end of cylinder 350 causing it to shift to the right with respect to rod 350a which is fixed at its outer end. Therefore, cylinders 350 and 355 shift to the right further shifting (via T-slide 305) rod 360a, cylinder 360, cylinder 365, and rod 365a to maximum extended position C for drive plate 300 for a full depth position of tray 20 at 46, FIG. 2. The guiding function of T-bar 390 will be evident in comparing positions A, B and C to maintain alignment of the multi-cylinder floating array with the drive plate.

Referring to FIG. 16, the chain and sprocket extending arrangement for the drive plates 300, 305, and 310 and angle beams 290 is diagrammatically illustrated in conjunction with the hydraulic system comprising the four cylinders 350, 355, 360 and 365.

The neutral position of the cylinders wherein the tray 20 is centralized with respect to the tower is illustrated at position A. Thus all cylinders are under pressure in order to positively lock the tray in the central position. Pressure maintenance for locking the position is preferred as, in fact, it is preferred also for the extended position of sub figures B and C even though hydraulic blocking by valving in a well known manner could be used. Referring to the diagrammatic components shown at position A, the drive plate 300 will be noted as being fastened at 400 to the piston rod 365A whereas at the other end of the hydraulic system array, the piston rod 350A is connected to the elevator frame at 395, all as herein before described and illustrated in the several views preceding, e.g., FIGS. 14 and 15.

Suitably fastened to the elevator frame (FIGS. 9, 10A, 10B) as by a clamp or other member, at 415, on a plate 416 wherein such plate is fastened to the cross plates 245c and 245d, is a sprocket chain 410 which passes around a sprocket wheel 410B carried by and just forward of the right edge of plate 300. Chain 410 is then fastened to the left end of and on the underside of drive plate 305 at 445.

Reference character 445 representative fastening locations for chains, one above and one below the drive plate 305 (FIG. 9) as set forth below.

From the upper surface of plate 300 to a sprocket 410D carried at the edge of drive plate 305 is a chain 411 the other end of which chain is fastened to the lower surface of the plate 310. Finally, a third chain 412 is fastened at 445, upper surface of plate 305, passing around the sprocket 410f for securement at 420 with one of the iron angle beams 200 which carried the tray 20.

All flexible members are thus described as chains although, of course, it will be understood that equivalent components such as cables, pulleys, belts, etc. could be used. All sprocket wheels are carried on cors extending just beyond the edges of the drive plates to which they are secured, e.g., the sprocket wheel 410f (FIG. 10B) carried at the edge of plate 310.

All chains shown in solid lines (FIG. 16A), and just described, effect positioning of the several plates and ultimately the tray 20 to the right to position 46, FIG. 2, for the chain position B, FIG. 16, and reference may be had to FIG. 15 for comparison therewith insofar as the hydraulic system is concerned. Either position 46 or 46' can be thus reached and the tray 20 held locked by full actuation of the cylinder or cylinders required for the desired extent of tray motion and subsequent maintenance of pressure to hold the position.

In the same manner, position of the tray to the first or second pallet positions for handling of pallets to positions 47 or 47' (FIG. 2) is accomplished by simple reverse action effected by the chains 410', 411', and 412' and the hydraulic positioning shown for the cylinders at position C of FIG. 14, such chains being shown dotted in the position A, FIG. 16. For neutral tray position the opposite set of chains are used, in either case.

Chain 410' is frame fastened at 425 to cross plate 245c and passes around the sprocket 410a at the left end of plate 300 (FIG. 10A) to terminate at the fastening 445' below plate 305. A second chain 411' is secured at the upper surface of 440' of plate 300 and passes around sprocket 410C to fastening at 450' at the lower surface of plate 310. Finally, a chain 412' fastens at 445' to the upper surface of plate 305 and passes around the sprocket 410E to be fastened at 430 to the other iron angle beam 200.

In general it will be noted that all of the drive plates carry sprockets at their ends and that the two series of chains are a reversed in layout geometrically.

In operation, when the plate 300 is hydraulically motivated in either direction it exerts a thrust via the sprocket wheel at one end or the other against the chain engaged therearound and for each increment of hydraulically driven travel of plate 300, the plate 305 moves outwards in the same direction for twice the distance of plate 300, in accordance with well known principles. Of course, the angularity as shown in FIG. 16A of the sides of the chain 410 or 410' makes a slight reduction in exact doubling of the movement, but this if of no significance since it is not present in the device and only a very large angle would appreciably reduce the doubling of the distance. However, plate 305 being thus driven in either direction does not double the travel of plate 310, nor does the travel of plate 310 double the travel of beams 290 and tray 20, but merely give single increment additive travel at each step. The reason for this is that the plate 300 must move in the same direction in order to actuate either chain series and this subtracts from relative increment increases between the remaining plates and the tray because their drive chains do not have fixed ends as do chains 410 and 410'. However, the actual travel of tray 20 is four time the travel of the plate 300.

The compactness and versatility of the tray transport power drive mechanism comprising hydraulic cylinders, and chains or other suitable belt-like members, will be apparent from the above description and the drawings. Thus, the tray and the coplanar nested beam pair supports are reversible and pass through their own rest positions in either direction. The hydraulic cylinders are all coplanar in a flat array integral unit floating between drive plates and beams and having limited rocking movement as the beams move. All chains and sprocket wheels are also disposed in this beam plane and are located in the spacing between the innermost beam pair 290. All sprockets are carried on short outrigger arms at the edges of the drive plates, and most of the chains pass between the webs of such plates. In particular, space is saved by skewing the sprockets 410c and 410d at the edges of drive plate 305, the chains 411 and 411' passing respectively therearound on both sides of that plate.

Thus, what may be termed "left" and "right" telescopic chain systems have chains and sprockets in reverse but symmetrical series, the chains of each system being individually secured in sequence from the elevator frame 226 to the final beams 290 via the drive plates 300, 305, 310 whereby sequential pull is exerted on the next succeeding plate (or ultimately beams 290 by virtue of thrust exerted by a proceeding plate. Except for chains 410 and 410', which have fixed reaction connections, the reaction connection for each chain is on the drive plate preceding the drive plate that carries the thrust sprocket for that chain. Accordingly, the initial thrust of plate 300 is transformed into a series of alternate chain tensions and plate thrusts via the sprockets to simultaneously telescope the beams by a succession of pulling forces which are virtually simultaneous in either left or right direction as viewed on FIG. 2, depending on which of the dual chain systems is being actuated, a matter of the direction of hydraulic drive of plate 300.

THE POSITION INDICATING SYSTEMS

While in commercial practice the stacker crane described herein would be fully automatically controlled by a system which does not form part of the present application. It can be manually controlled, if desired, by more personal skill in positioning the tower and the tray. However, as a practical matter for precise positioning mechanical position indicating means should be utilized, particularly since the tower may have a horizontal traverse of several hundred feet and a height of as much as 60 feet. Obviously it would be quite impractical for an operator to be present at the tower location in order to precisely control it and to control the tray for the precise positioning needed.

Accordingly, referring to FIG. 4A, an indicating sensor and signal transmitter arrangement for vertical movement is illustrated which comprises a shaft angle encoder 500 secured to the elevator on an outrigger arm 505 and coupled to a sprocket wheel 515. A fixed sprocket chain 520 is carried on the corner angle iron 145. As the elevator moves vertically the sprocket wheel is caused to rotate by the fixed chain which rotates the encoder. The encoder is a conventional rotary type, for example, Nordon type ADC-13-BNRY-E, style 46, which by conventional electrical connections is capable of sending a binary signal of distinct character for each quarter inch of vertical movement of the elevator. Such binary signals can be continued in conventional readout aparatus to apprise an operator of the vertical position of the tray elevator and the tray 20. The operator can thus control motor 80 to reach a selected storage cell level. Of course, the tray would be initially positioned a couple of inches below the cell support rails 48 for picking up a pallet or initially positioned a couple of inches above for depositing a pallet, prior to being horizontally extended either to first or second pallet positions for either purpose. The final slight movement of the tray up or down would be under slow motor control, either by gearing, or circuitry or motor construction, all long known, and with the aid of the indicating system readout in an obvious manner.

Referring now to FIG. 6A, the same arrangement is used for indicating the precise horizontal position of the tower wherein the shaft angle encoder 550, the same type as encoder 500, and sprocket wheel 560 are carried on the arm 39 to engage the chain 565 fixed lengthwise to the guide rail iron angle 36 fixed to the storage rack construction. Thus by the vertical and horizontal indicating systems an operator would know the position of the tower with respect to the length of the storage grid and could thus precisely position the tower in front of a selected storage cell as well as positioning the tray vertically, it being understood that suitable slow speed control motors 70 and 80 are utilized or other means for effecting "creep" are present.

It is, of course, necessary for an operator too far removed from a tray to observe it totally, to have an indicating system so that he will know the exact position of the tray 20 with respect to the tower. Referring to FIG. 8, such a system is illustrated comprising a chain reel 600 carried by a fixed beam 275 and having a sprocket chain 610 maintained in tension by a spiral spring (not shown) within the reel which chain extends around a sprocket wheel 615 carried at the outer end of plate 245d and thence passes between a pair of rollers 620 and 625 carried by the fixed beam and having an end 630 fixed to the tray 20 (FIG. 7). Accordingly, regardless of the direction of motion of tray 20 as indicated by the reversed arrows (FIG. 8), the sprocket chain will be pulled in the same direction from the reel. This causes rotation of sprocket wheel 615 to actuate the arm of a switch 640 between contact positions such that a first position of the switch arm gives a signal to apprise the operator that the tray is in central position, whereas when the tray starts to move the switch arm moves to a successive contact position indicating that the tray is in first pallet position, or the switch moves to a further contact position to signal that the tray is in second pallet position, corresponding to positions 46, 47 or 46′, 47′.

Details of the switch mechanism are not necessary, but obviously a suitable gearing between sprocket wheel 615 and the switch 640 would be utilized so that full traverse of the tray in either direction would move the switch arm through the several contacts and return. The signals used could be three lights of different colors wired to the switch in an obvious manner.

CONTROLS

From all the preceding, it will be apparent that any conventional control system can be utilized, for example, the motors 70 and 80 can be energized simultaneously and either the motors 70 or the motor 80 controlled to creep when the operator is apprised by readout that the tray is close to the proper respective horizontal or vertical position, the respective motors being stopped by braking when the readout indicates precise positions, i.e., within ¼ inch with the particular encoders used. Similarly, the hydraulic cylinders 255 (FIG. 7) for centralizing the pallet would be operated by solenoid valves and this could be done at the time the pallet is picked up on the tray 20 from a conveyor, or at any time prior to actual insertion in a cell.

The hydraulic cylinders 350, etc. (FIGS. 14, 15, 16) for the tray transport telescopic mechanism are likewise solenoid valve operated and, in fact, such hydraulic system requires only respective solenoid operated multiway valves all of conventional construction and hook-up, although, of course, any suitable hydraulic circuitry control system could be utilized. In an operative embodiment conventional solenoid spool valves as made by Vickers Div. of Sperry-Rand Corp. were used, Model DG 454-012A-50 connected to a pressure source and sump and to the cylinders, all in the usual manner and carried by the tower and elevator, whereby one end of each cylinder was always under pressure (position A, FIG. 14) to maintain the tray 20 in central position until it is desired to actuate it. Such valves are spring biased to an initial position for that effect, by spring biased return from an actuated position.

It will of course be appreciated that various obviously required components are omitted for the sake of clarity, such as flexible hoses to hook up to the hydraulic cylinders and electric cables for the motors. Such connecting components are well known in the field, and as a matter of design, various types are usable. Likewise, as a matter of design, the solenoid valves for the various sets of hydraulic cylinders can either be at a fixed control point or carried by the tower. Further, power control circuitry and switching circuitry likewise could be at a fixed control point, but preferably is carried by the tower at the control panel 60 (FIGS. 1, 2).

The compactness and practicality of the invention should be apparent from the description and the drawing, and in particular, the exceedingly simple power drive means for telescopically transporting the tray reversibly via flexible loop members such as sprocket chains which roll around sprocket wheels, all within the vertical and horizontal planes defined by the innermost pair of beams 290. Thus by providing dual systems of what might be called zig-zag orders of sequentially connected chains, a very economical yet highly effective arrangement is provided.

Having thus described the invention, I am aware that various modifications can be made within the spirit of the concept and therefore do not seek to be limited to the exact illustration herein.

I claim:

1. A stacker crane tray mechanism comprising a tray and movable support means therefor, said support means comprising a plurality of pairs of telescopically articulated beams;
    one beam pair being attached to said tray and one other beam pair being relatively fixed and with respect to which fixed beam pair all other beam pairs are telescopically movable;
    there being beam pairs intermediate said fixed beam pair and the beam pair attached to said tray, and each beam of said intermediate beam pairs having a guide channel extending in to one face thereof and having guide rollers extending from the other face thereof directly opposite the respective channel thereof;
    wherein all said beam pairs are telescopically connected by rollers of beam pairs extending into guide channels of immediately adjacent beam pairs;
    drive plates secured to respective movable beam pairs for effecting telescopic movement thereof; and each having a central channel with a flange extending laterally on each side of the respective channel and secured to a beam of a respective pair; said channels being nested and having spaces there between and said drive chain means being disposed in said spaces;
    said drive plates being sequentially coupled by said drive chain means so that driven movement of a first of said drive plates effects progressively extended movement of the remainder of said drive plates and the respective beam pairs, to drive said tray.

2. A stacker crane tray mechanism as set forth in claim 1;
    said chain means comprising a series of chains for a particular direction of telescopic movement of said beam pairs and tray;
    wherein a first chain has a relatively fixed end and passes around bearing means carried by said first drive plate and is fastened to a next adjacent drive plate;
    said next adjacent drive plate and all drive plates thereafter up to a final drive plate being alternately fastened to each other in pairs of alternate plates by a respective chain passing around bearing means carried by a drive plate between each pair of alternate plates;
    a final chain being fastened to a drive plate next before said final drive plate and to said tray and passing around bearing means carried by said final drive plate intermediate said next to final drive plate and said tray.

3. A stacker crane tray mechaism comprising a tray and reversibly movable support means therefor to movably support said tray in being driven to either of two selective positions in either of two directions;

said support means comprising a plurality of articulated beam means one of which is attached to said tray and another of which is relatively fixed and with respect to which fixed beam means all other beam means are movable and are drivingly connected to carry said tray to said selective positions upon a first of said beam means being driven;

and hydraulic drive means comprising a plurality of double-acting hydraulic cylinders arranged in pairs having respective piston rods; a cylinder of each pair being integrally connected to a cylinder of another pair; one rod of each pair being integrally connected to a rod of another pair;

means whereby the other piston rod of one of said pairs of cylinders has an end relatively fixed with respect to said relatively fixed beam means, and the other piston rod of the other of said pairs of cylinders is drivingly connected to said beam means;

means interconnecting said beam means whereby movement of said first beam means effects motion of all said movable beam in the same direction;

whereby selective pressurization of said cylinders effects motion of said tray to a selective position in a direction dependent upon direction of pressurization of said cylinders.

4. A stacker crane tray mechanism as set forth in claim 3;

said drive plates each comprising a channel portion having extending flanges to which the beams of a respective beam pair are secured; said channel portions being nested and said hydraulic cylinder means housed within the innermost channel connected to drive said first drive plate.

5. A stacker crane tray mechanism comprising a tray and support means therefor, said support means comprising a plurality of pairs of telescopically articulated movable beams and a relatively fixed support;

a first movable beam pair being attached to said tray and a last movable beam pair having support on said relatively fixed support and with respect to which support all movable beam pairs are telescopically movable;

beam pairs intermediate said first and last beam pairs;

guide channels in, and guide rollers on, respective adjacent faces of the beams of said pairs, whereby all said beam pairs are telescopically connected by rollers extending into guide channels of immediately adjacent beams;

a drive plate for each movable beam pair and secured to the beams thereof;

chain means connecting said drive plates whereby said beam pairs are reversibly movable to support said tray in a translated position when said last beam pair is driven;

hydraulic drive means comprising two pairs of double acting hydraulic cylinders; a cylinder of each pair being integrally connected to each other and said connected cylinders being thus movable in unison;

said cylinders having respective piston rods and a piston rod of one said pair of connected cylinders being integrally connected to a piston rod of the other said pair of connected cylinders;

means whereby the other piston rod of said one pair of connected cylinders has an end relatively fixed and whereby the other piston rod of said other pair of connected cylinders is drivingly connected to the drive plate of said last beam pair;

whereby selective pressurization of said cylinders effects selective motion of said connected cylinder pairs and piston rods to actuate said last named drive plate to a selective extent and in a direction dependent upon direction of pressurization of said cylinders for driving said tray by said chain means and the drive plates of said beam pairs.

6. A stacker crane tray mechanism comprising a tray and a movable support therefor comprising a plurality of telescopically movable articulated beams having a support means;

a first of said beams being attached to said tray for support thereof, and a last of said beams being movably carried by said support means;

beams intermediate said latter beams;

all said beams sequentially supporting each other in the course of telescopic movement, and support and guide means intermediate said beams for effecting said sequential support;

a tensile drive means sequentially coupled to said beams so that driven movement of said last movable beam effects progressively extended movement of the remainder of said movable beams to extend and support said tray;

hydraulic cylinder means comprising two pairs of double acting hydraulic cylinders each pair being integrally secured to each other and said pairs having relative movement with respect to each other;

said cylinders having respective piston rods;

a rod of one cylinder pair being connected to a rod of another cylinder pair;

the other rod of said one cylinder pair having an end relatively fixed and the other rod of the other cylinder pair being drivingly connected to said last movable beam;

whereby selective pressurization of said cylinders effects selective motion of said cylinders and piston rods to actuate said beams bidirectionally and to either of two positions in either direction.

7. A stacker crane tray mechanism comprising a tray and movable support means therefor, said support means comprising a plurality of pairs of telescopically articulated beams;

one beam pair being attached to said tray and one other beam pair being relatively fixed and with respect to which fixed beam pair all other beam pairs are telescopically movable;

the beam pairs intermediate said fixed beam pair and the beam pair attached to said tray having guide channels at one face thereof and guide rollers at the other face thereof;

wherein all said beam pairs are telescopically connected by rollers of beam pairs extending into guide channels of immediately adjacent beam pairs;

drive plates secured to respective beam pairs for effecting telescopic movement thereof;

said drive plates extending transversely of the path of movement of said beam pairs and having parallel center sections horizontally spaced;

said center sections being nested and having spaces therebetween and drive chain means being disposed in said spaces;

said drive chain means and said drive plates being sequentially coupled by said drive chain means so that driven movement of a first of said drive plates effects progressively extended movement of the remainder of said drive plates and the respective beam pairs, to drive said tray.

8. A stacker crane tray mechanism as set forth in claim 7, said drive plates being reversibly movable;

and hydraulic drive means comprising a plurality of double acting hydraulic cylinders secured in pairs, one pair being connected to another pair by connection of a piston rod of each of said pairs to each other;

the cylinders of each pair being connected to each other and the respective rods thereof extending in opposite directions;

means whereby the other piston rod of one of said pairs has an end relatively fixed with respect to said relatively fixed beam pair and the other piston rod of the other of said pairs is drivingly connected to said first drive plate;

whereby selective pressurization of said cylinders effects motion of one or both of said piston rods to actuate said first drive plate to a selective extent and in a direction dependent upon direction of pressurization of said cylinders.

* * * * *